US007802725B1

(12) United States Patent
Roth

(10) Patent No.: US 7,802,725 B1
(45) Date of Patent: Sep. 28, 2010

(54) CUSTOMIZING SECURITY FEATURES

(75) Inventor: Joseph D. Roth, Springboro, OH (US)

(73) Assignee: NCR Corporation, Duluth, GA (US)

( * ) Notice: Subject to any disclaimer, the term of this patent is extended or adjusted under 35 U.S.C. 154(b) by 800 days.

(21) Appl. No.: 11/640,764

(22) Filed: Dec. 18, 2006

(51) Int. Cl.
*G06K 7/10* (2006.01)

(52) U.S. Cl. ....................................... 235/454; 235/487

(58) Field of Classification Search ................. 235/487, 235/491, 494, 454
See application file for complete search history.

(56) References Cited

U.S. PATENT DOCUMENTS

2007/0119951 A1* 5/2007 Auslander et al. ........... 235/491

* cited by examiner

*Primary Examiner*—Karl D. Frech

(74) *Attorney, Agent, or Firm*—Charles Q. Maney; Christopher P. Ricci

(57) ABSTRACT

A printer for printing customized security features on a medium, such as a sheet or roll of labels. The printer comprises: a first container storing a first security fluid having a first luminescence signature and a second container storing a second security fluid having a second luminescence signature different to the first luminescence signature. The printer also comprises a printer controller for receiving a printing request and for selectively controlling fluid application from the first and second containers to apply the first and second security fluids to the medium in a proportion required to produce a composite luminescence signature that fulfils the printing request.

8 Claims, 10 Drawing Sheets

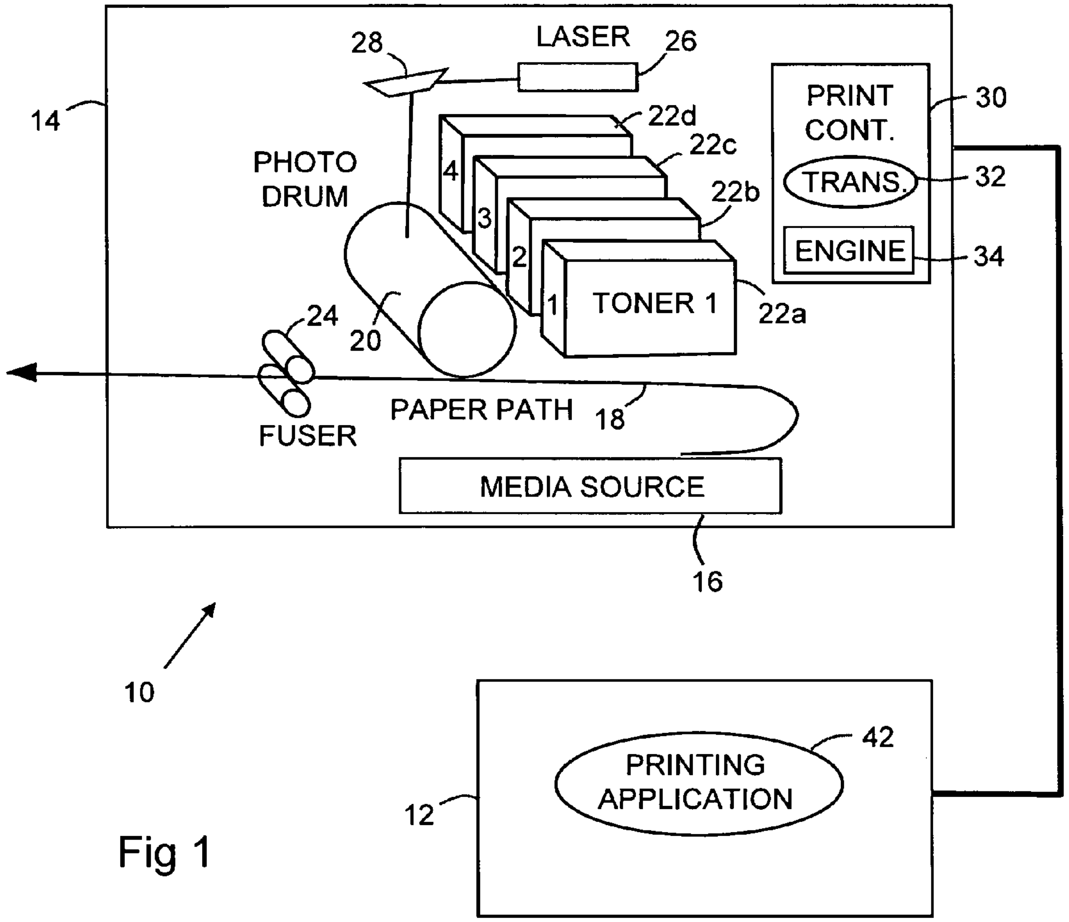
Fig 1
Fig 2
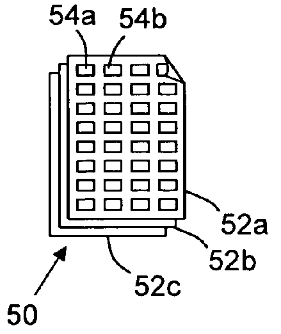
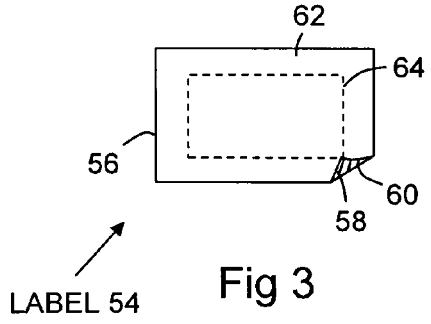
Fig 3

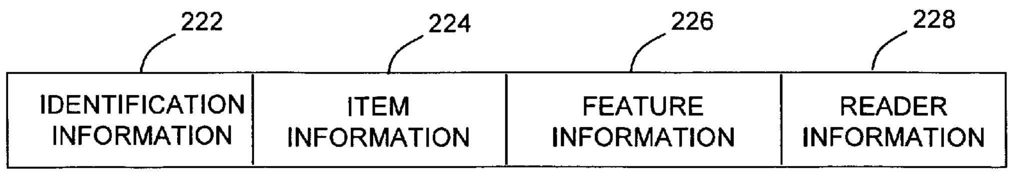
Fig 13A
220
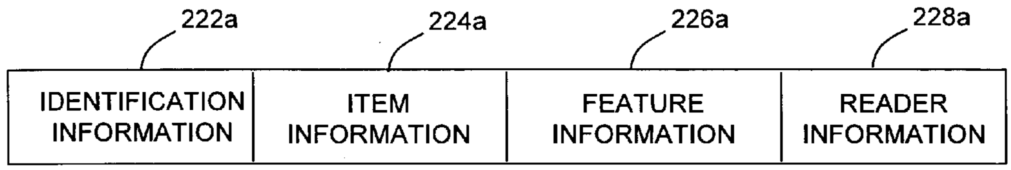
Fig 13B
220a
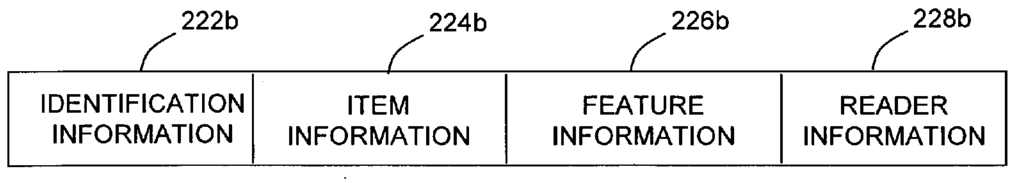
Fig 13C
220b
Fig 20
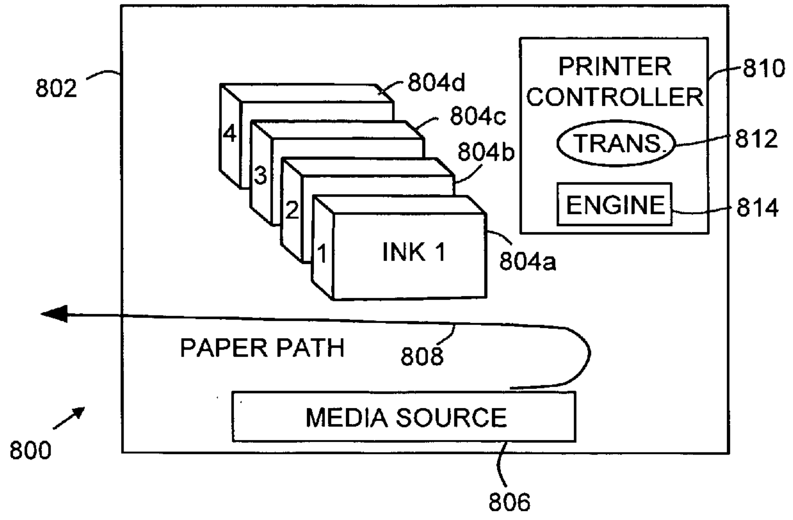

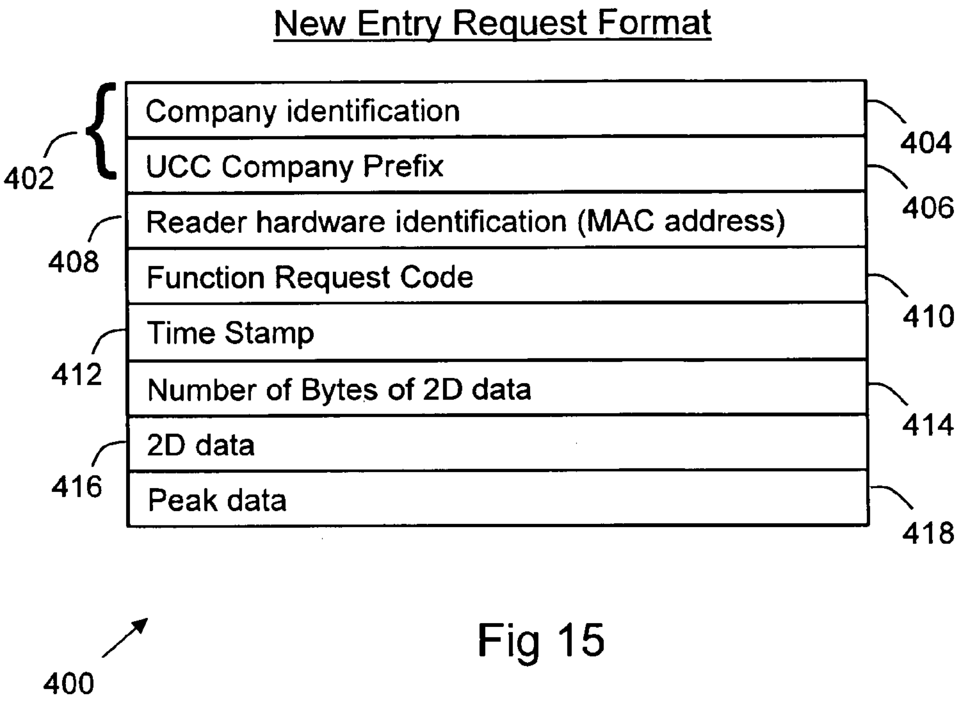
Fig 15
Fig 16
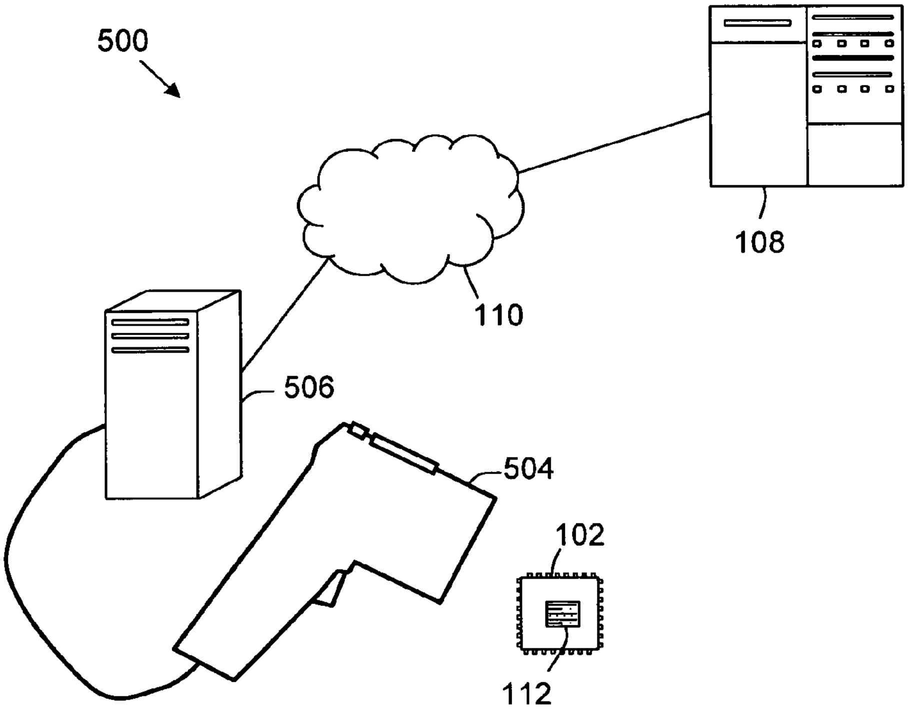

CUSTOMIZING SECURITY FEATURES

The present invention relates to customizing security features.

BACKGROUND

It is known to incorporate a security feature into a valuable item, such as a banknote, to provide a recipient of the item with evidence of the item's authenticity. If a single security feature is used on all items of the same type (for example, all twenty dollar bills), then once the single security feature is compromised, that type of item can be compromised at will by counterfeiters.

It would be desirable to be able to reduce the possibility of an item being compromised even if the security feature protecting that item is compromised.

SUMMARY

According to a first aspect of the present invention there is provided a printer for printing customized security features on a medium, the printer comprising: a first container storing a first security fluid having a first luminescence signature, a second container storing a second security fluid having a second luminescence signature different to the first luminescence signature, a printer controller for receiving a printing request and for selectively controlling fluid application from the first and second containers to apply the first and second security fluids to the medium in a proportion required to produce a composite signature that fulfils the printing request.

As used herein, a luminescence signature refers to aspects of luminescence from a security feature, where the aspects are unique to that security feature. These aspects may include one or more of presence or absence of emission at one or more wavelengths; presence or absence of a peak in emission at one or more wavelengths; the number of emission peaks within all or a portion of the electromagnetic spectrum comprising, for example, ultraviolet radiation to infrared radiation (e.g., approximately 10 nm to 1 mm); rate of change of emission versus wavelength, and additional derivatives thereof; rate of change of emission versus time, and additional derivatives thereof; absolute or relative intensity of emission at one or more wavelengths; ratio of an intensity of one emission peak to an intensity of another emission peak or other emission peaks; the shape of an emission peak; the width of an emission peak; or such like.

The printer may include many features of a conventional inkjet, laser, or thermal transfer printer.

The first and second security fluids may be invisible security fluids; that is, fluids that are not visible to the human eye.

A composite signature is a luminescence spectrum composed of the first and second luminescence signatures in a ratio determined by code printing parameters. The code printing parameters are directly related to the quantities of each security fluid to be applied.

The printing request may include a composite signature code. The composite signature code is typically transformed by the printer to create the code printing parameters. The composite signature code may be directly related to the code printing parameters. One example of a direct relationship is where the composite signature code comprises the code printing parameters, either in plain text or in encrypted format. Another example of a direct relationship is where the printer controller uses an algorithm to transform the composite signature code into the code printing parameters. Alternatively, the composite signature code may be indirectly associated with the code printing parameters. For example, the printer controller may use the composite signature code to access a lookup table that stores a mapping of composite signature codes to code printing parameters. In such an example, the composite signature code is effectively a print number selected from n possible print numbers; where n is selected on a predetermined or random basis. The print controller may map the value of n to one of n predetermined sets of code printing parameters. This has the advantage that the actual printing parameters are not transmitted, and therefore cannot be intercepted by a third party.

The printer controller may include a communications facility for receiving a composite signature code.

The communications facility may relay the composite signature code to a translation facility that converts the composite signature code to code printing parameters. The code printing parameters can then be used by a print engine to control fluid application from the first and second containers. One code printing parameter may be provided for each security fluid used.

The printer controller may (i) use the composite signature code to access a table storing code printing parameters corresponding to each composite signature code, (ii) retrieve the corresponding code printing parameters, and (iii) relay the retrieved code printing parameters to the print engine.

The printer may include additional containers, each storing a different security fluid. If there are three containers then these will be similar to the RGB color printing process. Four containers will be similar to the CMYK color printing process. However, because the purpose of the printer is to produce luminescence signatures (rather than colors) there may be more than four containers available. For example, ten containers may be provided, each with a different security fluid, but only three or four fluids may be used to fulfil any particular printing request. The number of security fluids that can be used is limited by the ability of a spectrometer to resolve the composite signature into its constituent security fluid components, which is influenced by the number and location of spectral peaks. If the security fluid has narrow spectral peaks, such as the peaks of a rare earth doped silica particle, then a relatively large number of security fluids may be used.

The printer may include a security module to prevent access to the code printing parameters. The security module may be tamper responsive, and may delete the code printing parameters if the security module is tampered with.

The printer may include a control value container storing a security fluid used as a control sample to facilitate subsequent measurements of the composite signature printed by the printer. The control sample may indicate the variation between what the printer has actually printed and what the code printing parameters indicate that the printer has printed. This indication may be used to scale or otherwise compensate the next print, or it may be recorded in a remote database and used when that composite signature is subsequently read.

The security fluid may be a liquid, such as an ink, or a solid, such as toner that flows onto paper, or a wax-like substance that flows when melted. The security feature fluid may include a pigment such as (i) silica-based particles doped with lanthanides, or (ii) other luminophores.

As used herein a "luminophore" is a luminescing substance that may be in the form of a pigment applied to an ink, or a fluid having luminescent properties, irrespective of whether electrons are localized or not.

The printer may be based on an inkjet printing mechanism, a laser printing mechanism, a thermal transfer printing mechanism, or any other convenient printing mechanism.

The actual printing mechanism used is not critical. Some printing mechanisms have advantages for certain applications and disadvantages for other applications.

In embodiments based on an inkjet printing mechanism, the first and second containers may be inkjet cartridges, and the print engine may control the number of drops of the security fluid applied, or the size of the drops of security fluid applied.

In embodiments based on a laser printing mechanism, the first and second containers may be toner cartridges.

In embodiments based on a thermal transfer printing mechanism, the first and second containers may be thermal ribbons. In such embodiments, the containers may carry but not enclose the security fluids.

The printer may print a reference number associated with the code printing parameters used. The reference number may be read subsequently to ascertain the composite signature, for example, by referencing a database or a table stored in a reader, or such like; alternatively, the reference number may comprise the printing parameters, either in plain text or encoded form.

The reference number may be printed in visible ink large enough to be human readable so that an operator of a security feature reader can verify that the composite signature is correct. The reference number may be printed in visible ink but too small to be read by the human eye without magnification. The reference number may be printed as a covert feature using ink that is not visible to the human eye, even with magnification.

The reference number may be read by a security feature reader and used to ascertain if the composite signature is correct.

The printer may include a security feature reader for reading a newly-printed customized security feature (having a composite signature) and ascertaining if the composite signature printed corresponds to what is expected for the code printing parameters used. The security feature reader may store a tolerance value in a remote database to indicate how closely the composite signature matches the expected composite signature for those code printing parameters.

This aspect of the invention has the advantage of being able to produce a covert security feature having a composite luminescence signature composed of individual luminescence signatures mixed in a proportion determined by a printing request.

According to a second aspect of the present invention there is provided a method of printing customized security features on a medium, the method comprising: receiving a printing request; ascertaining a proportion of a first security fluid and a proportion of a second security fluid required to produce a composite signature that fulfils the printing request; and selectively controlling application of the first security fluid and application of the second security fluid in the ascertained proportions to fulfil the printing request.

The method may include the further step of printing a reference number indicating the proportions of the first and second security fluids used, respectively. The reference number may indirectly indicate the proportions used. For example, the reference number may be used as a key to access a table or database storing the proportions of the first and second security fluids used, or the reference number may comprise cipher text that encodes the proportions of the first and second security fluids used. Alternatively, the reference number may directly indicate the proportions used. For example, the reference number may disclose the proportions of the first and second security fluids used in plain text.

The method may include the further step of relaying the proportions to a remote data management system for storage therein.

The method may comprise the further step of automatically generating a printing request in response to a serial number read by a security feature reader. The serial number (or part thereof) may be mapped to code printing parameters so that there is a predetermined relationship between the code printing parameters and the serial number (or part thereof). Alternatively, the code printing parameters may be derived from predefined numerical digits in the serial number. This would allow a security feature reader to derive the correct composite signature by reading the serial number, which would allow off-line (that is, not connected to a remote database) verification of the composite signature.

According to a third aspect of the present invention there is provided a method of printing customized security features on a medium, the method comprising: receiving a printing request; selectively controlling fluid application from (i) a first container storing a first security fluid having a first luminescence signature and (ii) a second container storing a second security fluid having a second luminescence signature different to the first luminescence signature, to apply the first and second security fluids to the medium in a proportion required to produce a composite signature that fulfils the printing request.

The medium may be a label. Alternatively, the medium may be an item onto which a composite security feature is printed directly.

According to a fourth aspect of the present invention there is provided a system for tagging items with a customized security feature, the system comprising: a reader for reading a unique code carried by an item; and a printer for printing a customized security feature associated with the unique code so that the customized security feature has code printing parameters derived from the unique code.

The reader and the printer may be incorporated within the same housing, or in different housings. In embodiments where the reader and printer are incorporated in the same housing, the reader may be provided in proximity to a feed path on which media is transported to enable reading of a security feature as the feature is transported.

The printer may print the customized security feature directly onto the item. Alternatively, the security feature may print the customized security feature onto a label that can be adhered to the item.

The item may carry the unique code directly, for example, the unique code may be laser etched onto the item. Alternatively, the item may carry the unique code indirectly, for example, the unique code may be printed on a label.

The system may further comprise a database for storing for each tagged item details of the unique code and its associated customized security feature.

The customized security feature may be associated with the unique code by having code printing parameters derived from the unique code. The code printing parameters may be derived directly or indirectly, as previously described.

The unique code may be a spatial code, such as a barcode.

The label may be provided as part of a batch in the form of a sheet of labels, a roll of labels, or the like.

The label may be transparent so that they can be applied over the unique code without obscuring the unique code.

The database may be used to authenticate the tagged item by receiving an authentication request from a reader. The authentication request may include the unique code (or a unique subset thereof) and data read from the customized security feature. The database may use the unique code to identify a record for the tagged item, and may ascertain if the data read from the security feature corresponds to that stored in the record for that tagged item.

These aspects of the invention have the advantage that they provide a mechanism for customizing security features so that the same type of security feature can have different properties depending on the proportions of security fluid used.

According to a fifth aspect of the present invention there is provided a mixer for creating customized security features on a medium, the mixer comprising: a first security fluid having a first luminescence signature, a second security fluid having a second luminescence signature different to the first luminescence signature, a controller for (i) receiving a request for a customized security feature having a particular composite luminescence signature and for (ii) selectively controlling fluid application of the first and second security fluids to the medium in a proportion required to produce a composite signature that fulfils the request for the customized security feature.

These and other aspects of the present invention will be apparent from the following specific description, given only by way of example, with reference to the accompanying drawings.

BRIEF DESCRIPTION OF THE DRAWINGS

In the accompanying drawings:

FIG. 1 is a simplified schematic diagram of a printer (a laser printer) for printing customized security features on a medium in accordance with one embodiment of the present invention;

FIG. 2 is a schematic diagram illustrating a batch of labels for use with the printer of FIG. 1;

FIG. 3 is a schematic diagram illustrating one of the labels of FIG. 2;

FIG. 13A is a bock diagram illustrating a data structure of a typical entry in the remote database of FIG. 12;

FIG. 13B is a bock diagram illustrating a data structure of a master entry in the remote database of FIG. 12;

FIG. 13C is a bock diagram illustrating a data structure of an item record entry in the remote database of FIG. 12;

FIG. 15 is a diagram illustrating the format of a new entry request packet sent from the secure reader of FIG. 10 to the remote database of FIG. 12;

FIG. 16 is a schematic diagram of an authentication system for authenticating an item tagged by the tagging system of FIG. 8;

FIG. 20 is a simplified schematic diagram of another printer (an inkjet printer) for printing customized security features on a medium in accordance with another embodiment of the present invention.

DETAILED DESCRIPTION

Figure 4A:
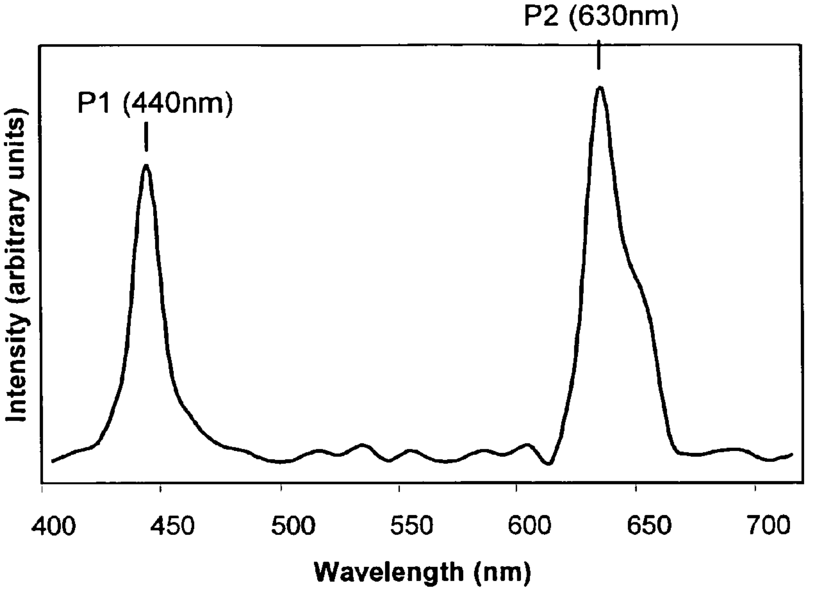
FIGS. 4*a* to 4*c* are graphs illustrating luminescence signatures of each of three different security fluids used in the printer of FIG. 1.

Reference is first made to FIG. 1, which is a simplified schematic diagram of a printer 10 coupled to a computer 12. The printer 10 has been adapted to print customized security features in accordance with one embodiment of the present invention.

Printer

In FIG. 1, the printer 10 is based on a conventional laser printer and comprises a chassis 14 housing various printer components. These printer components include: a media source 16 that delivers items of media (such as paper, sheets of labels, and the like) along a media path 18 to a photosensitive drum 20. The photosensitive drum 20 receives toner particles from some or all of four toner cartridges 22*a, b, c, d* and then transfers the toner from the drum 20 onto the passing media. The toner covered media then passes through a fuser 24 that bonds the toner to the media using a combination of heat and pressure. The printer 10 includes a laser 26 and an associated mirror arrangement 28 for writing charges onto the photosensitive drum 20 in response to commands received from a printer controller 30. The printer controller 30 receives print requests from the computer 12.

Each toner cartridge 22 contains a different security fluid having a unique luminescence signature. In this embodiment, four different security fluids are available for printing onto a media item. The combination of two or more of these security fluids in a relatively small area produces a composite security feature having a composite signature. The composite signature has properties determined by the relative percentages of the different security fluids used. By varying the percentages of the security fluids used it is possible to customize a composite security feature.

The interaction between the various components within the printer 10 is very similar to that of a conventional laser printer. The main difference is that instead of containing colors, the toner cartridges 22 contain security fluids in toner form. The particular security fluids used herein are pigments based on silica doped with rare earth elements. This type of pigment is described in U.S. Pat. No. 7,129,506 to Ross et al, entitled "Optically Detectable Security Feature," and US patent application number 2005/0143249 to Ross et al, entitled "Security Labels which are Difficult to Counterfeit", both of which are incorporated herein by reference. Conversion of pigments to toner is performed commercially by various companies, including KLE, which has a Web page at www.colortoner-.com.

The printer controller 30 includes a conventional translation program 32 that translates received printing parameters (for example, in RGB format) into control parameters for controlling the type and amount of toner to be applied. The printer controller 30 also includes a print engine program 34 that uses control parameters output by the translation program 32 to control the components in the printer 10 (such as the laser 26 and associated mirror arrangement 28) so that the desired amounts of each toner are deposited to fulfil a print request.

The printer controller 30 receives a print request comprising printing details. Conventional printing details include graphical information (including the text or images to be printed), location information (including details of where each text or image is to be printed) and color information (including an RGB code for each color on the text and images). A conventional color laser printer typically converts the RGB code into corresponding CMYK parameters using the translation program 32.

The CMYK parameters indicate the amount of Cyan, Magenta, Yellow, and Black to be used for each text or image pixel. There are typically four CMYK parameters, one for each of the four colors. Each parameter represents the amount of that color (from 0 to 1) to be used for that pixel. A conventional color laser printer includes four toner cartridges, one for Cyan, one for Yellow, one for Magenta, and one for Black. A conventional printer controller uses the C parameter to control the amount of Cyan used, the M parameter to control the amount of Magenta used, and so on. The amount of toner used is controlled (in both conventional laser printers and in this embodiment) by controlling the charge applied to the photosensitive drum 20.

In this embodiment, the four toner cartridges 22 contain different security fluids rather than different colors. The security fluids in three of the toner cartridges 22*a,b,c* are invisible to the human eye. However, the fourth security fluid (toner cartridge 22*d*) corresponding to the K (black) color includes a black pigment and is only used if some human readable data is to be printed, for example, a reference number. If no human readable data is required, then only the other three toner cartridges (22*a* to 22*c*) are used.

The computer 12 includes conventional components (such as a microprocessor, memory, disk storage, an operating system, printer drivers for the laser printer 10, and such like) and executes a printing application 42 that allows a user to create a batch 50 of security labels, as illustrated in FIG. 2.

The batch 50 comprises a plurality of sheets 52*a, b, c*, . . . m. Each sheet 52 comprising a plurality of security feature labels 54*a, b*, . . . n that are die cut and releasably mounted on the sheet 52. In this embodiment, the labels are transparent. For illustration purposes, only three sheets 52 and thirty-two labels 54 are shown in FIG. 2, but a security feature batch 50 may comprise many more sheets 52, and each sheet may comprise many more labels 54 than are illustrated in FIG. 2.

As best seen in FIG. 3, each security feature label 54 comprises a transparent carrier 56 having a lower surface 58 covered with a layer of adhesive (illustrated by hatching 60), and an upper surface 62 on which will be printed a composite RE doped silica security feature (illustrated in FIG. 3 by box 64) invisible to the human eye, referred to herein as a "printed composite security feature" 64.

The printing application 42 may be based on a conventional word processing or desktop publishing application, and presents a user with templates that automatically indicate to a user the location of each label 54 relative to the sheet 52. The printing application 42 allows a user to select a shape or text to be printed on each label, and a "color" for that shape or text. The "color" is actually a composite signature code represented by three parameters. The three parameters of the composite signature code are analogous to the RGB parameters associated with a color. If the user desires to print human readable data, then the user can select a shape or text and ensure that the shape or text is 100% black (corresponding to all RBG parameters set to zero). This will indicate to the printer 10 that only toner cartridge 22*d* is to be used to print that information.

The printing application 42 also allows a user to select random colors on a sheet. The user is prompted for the number of different colors used (for example, ten), and optionally a shape (for example, a rectangle), and optionally a size (for example, as a percentage of the label surface area). The printing application 42 then randomly selects n different colors (where n is the number selected) from a color palette, and randomly assigns one of these n colors to each label 54 on the sheet 52. The color palette may be created by the user or may be provided as part of the printing application 42. Each color comprises a composite signature code having three components: R, G, and B, each component having a value between 0 and 255.

When received by the printer 10, the translation program 32 in the printer controller 30 transforms the composite signature code into a set of code printing parameters comprising four components, C, M, Y, and K, each component having a value between zero and one. The print engine 34 uses each of these four components to control the laser 26 and associated mirror arrangement 28 to apply each security fluid from its respective toner cartridge 22*a, b, c, d* in the correct proportion to fulfil the print request.

Customized Printing

To illustrate this customized printing, reference will now be made to FIGS. 4*a* to 4*c*, which are graphs illustrating the luminescence signature of each of the three different security fluids used in cartridges 22*a, b*, and *c*. The luminescence signatures are recorded by spectrometer-based readers, such as those described in U.S. Pat. No. 7,129,506 to Ross et al, entitled "Optically Detectable Security Feature," and US patent application number 2005/0143249 to Ross et al, entitled "Security Labels which are Difficult to Counterfeit". A simple spectrometer-based reader is illustrated in FIG. 5.

The reader 70 includes a spectrometer 72 for detecting luminescence in the visible and near infra-red regions of the electromagnetic spectrum, and an excitation source 74 in the form of LEDs disposed on opposing sides of the spectrometer 72 and emitting in the ultra-violet region of the electromagnetic spectrum. The LEDs 74 are coupled to a reader controller 76 by power lines 78, and the spectrometer 72 is coupled to the reader controller 76 by power and data lines 80. The reader controller 76 measures and outputs the luminescence spectra from the luminophore being read (in this embodiment, the printed composite security feature 64).

Figure 5:
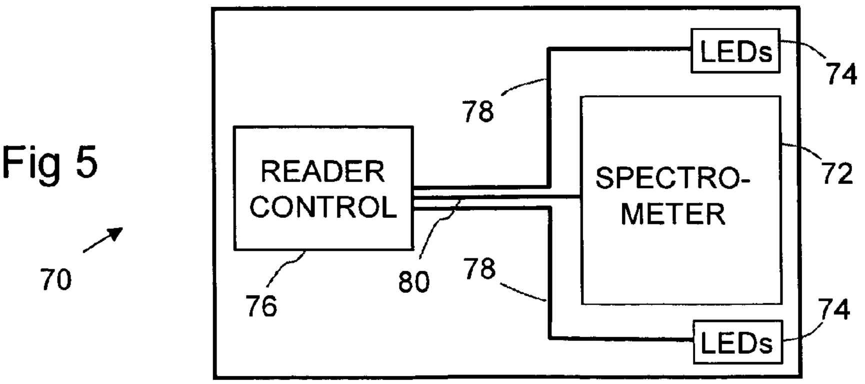
FIG. 5 is a simplified schematic diagram of a reader for reading luminescence signatures from customized security features printed by the printer of FIG. 1.

As can be seen from FIG. 4*a*, the first security fluid has luminescence peaks at 440 nm (P1) and 630 nm (P2). The first security fluid is stored in toner cartridge 20*a* and corresponds to the C component of the code printing parameters.

Figure 4B:
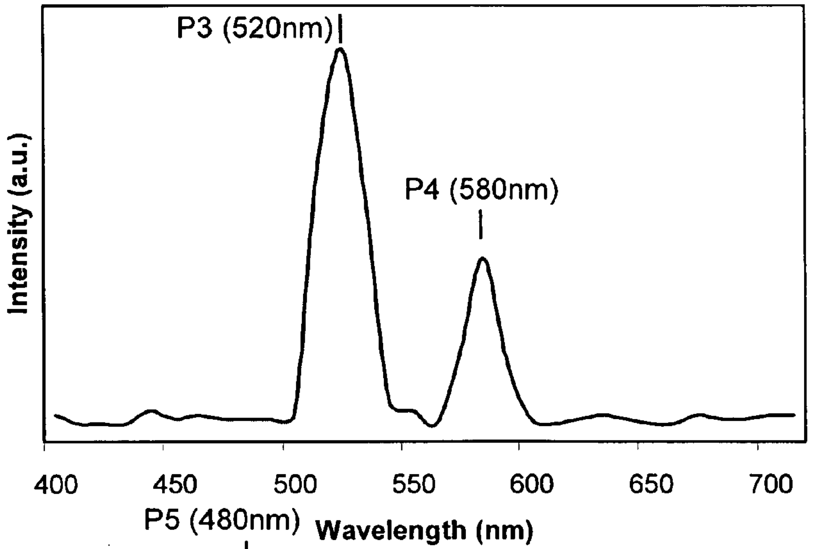

As can be seen from FIG. 4*b*, the second security fluid has luminescence peaks at 520 nm (P3) and 580 nm (P4). The second security fluid is stored in toner cartridge 20*b* and corresponds to the M component of the code printing parameters.

Figure 4C:
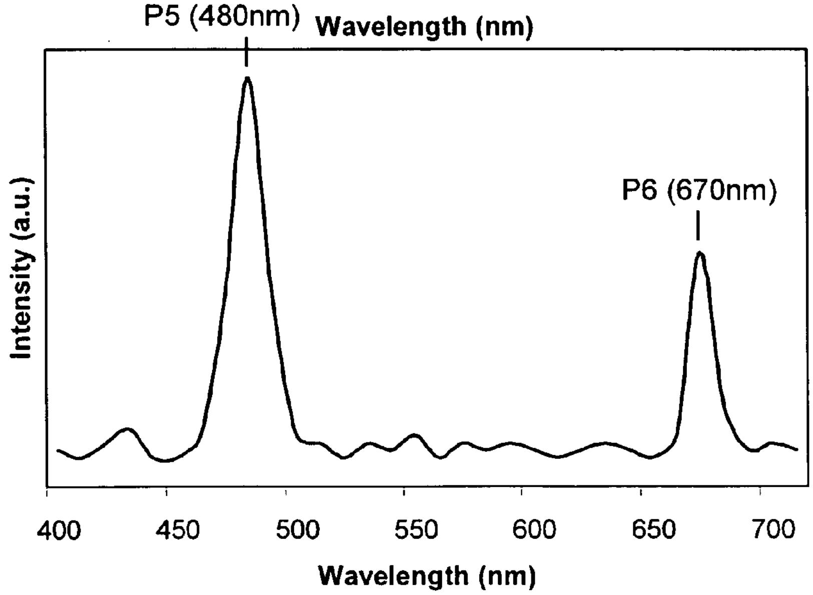

As can be seen from FIG. 4*c*, the third security fluid has luminescence peaks at 480 nm (P5) and 670 nm (P6). The third security fluid is stored in toner cartridge 20*c* and corresponds to the Y component of the code printing parameters. The intensity values (in arbitrary units) for these peaks (P1 to P6) are shown in Table 1 below.

TABLE 1

Intensities of peaks from FIGS. 4a to 4c

| Peak Number, Designation, and Wavelength | IntensityValue (a.u.) |
|---|---|
| P1 (C) 440 nm | 290 |
| P2 (C) 630 nm | 360 |
| P3 (M) 520 nm | 450 |
| P4 (M) 580 nm | 210 |
| P5 (Y) 480 nm | 280 |
| P6 (Y) 670 nm | 160 |

From Table 1, the ratio of peak intensity from P1:P3:P5 is 290:450:280; which, when normalized (by dividing by 290), yields 1:1.55:0.97.

Figure 6:
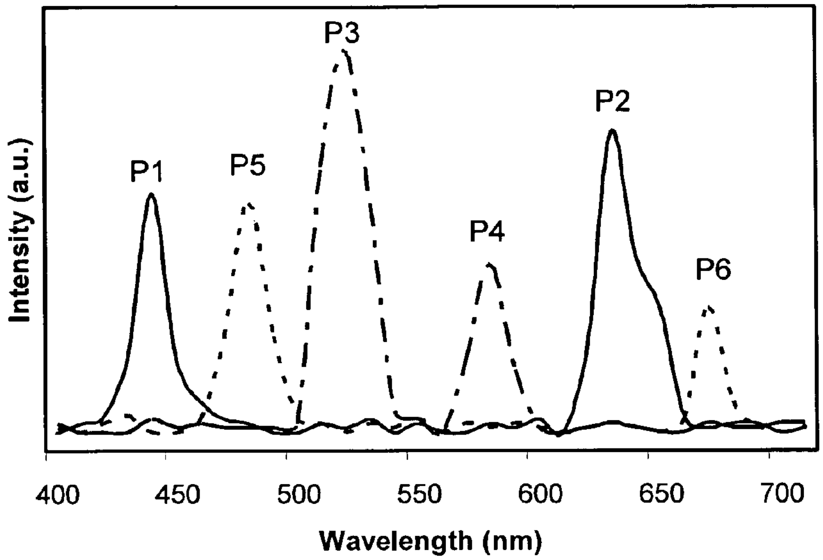
FIG. 6 is a graph illustrating a composite signature produced from a combination of the three different security fluids having the luminescence signatures shown in FIGS. 4*a* to 4*c* in equal proportions.

Reference will now also be made to FIG. 6, which is a graph illustrating a composite signature produced from a combination of the three different security fluids of FIGS. 4*a* to 4*c* in equal proportions. This composite signature is produced by printing a small area using the three security fluids (in cartridges 22*a* to 22*c*) and having code printing parameters set to the same non-zero value for each security fluid; for example, the code printing parameters could be "100,100, 100", where the first digit refers to the first security fluid (toner cartridge 20*a*), the second digit refers to the second security fluid (toner cartridge 20*b*), and the third digit refers to the third security fluid (toner cartridge 20*c*). The values of the intensities of the peaks P1 to P6 measured from FIG. 6 would be a multiple of the code printing parameters above. In other words, the ratio of P1:P3:P5 would be a multiple of 1:1.55: 0.97 (C:M:Y).

In this embodiment, the composite signature code provided by the printing application 42 is divided by two hundred and fifty-five (255) to produce the code printing parameters for the first three security fluids (cartridges 22*a, b, c*), unless the composite signature code is 0,0,0, in which case the printing is 100% K (100% of the fourth security fluid from cartridge 20*d*) without any of the first three security fluids (cartridges 22*a, b, c*).

If the code printing parameters used were "50,50,50", then the composite signature would be very similar to that shown in FIG. 6, with the ratios of the peaks P1:P3:P5 being identical (1:1.55:0.97), but the absolute intensity value of each of the peaks being lower than the corresponding peak in FIG. 6. However, because absolute intensity values are not used, the code printing parameters "50,50,50" would not produce a composite signature that was distinguishable from that produced by the code printing parameters "100,100,100" or "30, 30,30" or any other sequence of three identical code printing parameters. There will however be some minor variations in the ratio due to noise (thermal, optical, and the like), misalignment, and other practical and experimental reasons.

If the code printing parameters used were "100,0,100", then there would be no second security fluid used (from toner cartridge 20*b*), so there would be no peaks P3 (520 nm) and P4 (580 nm) in the composite signature. The ratio of the intensity of peaks P1:P3:P5 would be 1:0:0.97. The ratio of the intensity of peaks P1 to P2 and peaks P1 to P5 would be identical to that shown in FIG. 6.

Figure 7:
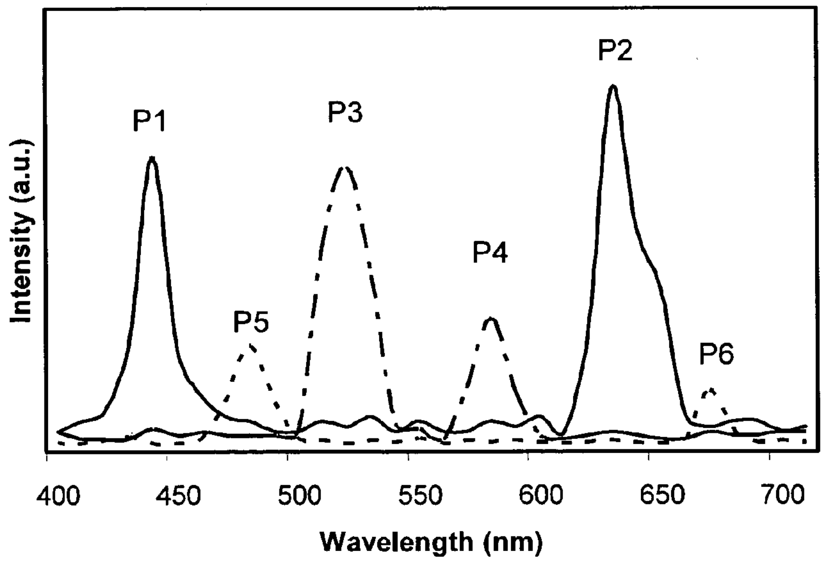
FIG. 7 is a graph illustrating a composite signature produced from a combination of the three different security fluids having the luminescence signatures shown in FIGS. 4*a* to 4*c* in unequal proportions.

Reference will now also be made to FIG. 7, which is a graph illustrating a composite signature produced from a combination of the three different security fluids of FIGS. 4*a* to 4*c* using the composite signature code "80,50,30", which is equivalent to any multiple of the ratios "1, 0.63, 0.38".

The intensities of the various peaks in FIG. 7 are shown in Table 2 below.

TABLE 2

Intensities of peaks from FIG. 7

| Peak Number | Intensity Value (a.u.) |
|---|---|
| P1 (C) | 232 |
| P2 (C) | 288 |
| P3 (M) | 225 |
| P4 (M) | 105 |
| P5 (Y) | 84 |
| P6 (Y) | 48 |

The ratio of the intensities of peaks P1:P3:P5 from Table 2 is 232:225:84. When normalized (divided by 232) this ratio yields 1:0.97:0.36 (C:M:Y) compared with a ratio of 1:1.55: 0.97 (C:M:Y) for equal proportions (FIG. 6). The proportion of M (security fluid from toner cartridge 20*b*) is 0.97/1.55, which is approximately 0.63; and the proportion of Y (security fluid from toner cartridge 20*c*) is 0.36/0.97, which is approximately 0.37. Thus, the reader 70 can record the composite signature and use the intensity values of the peaks in the composite signature to deduce the proportions of the different security fluids used. In this example, the ratio of toner cartridge 20*a* to toner cartridge 20*b* to toner cartridge 20*c* deduced by the reader 70 is 1:0.63:0.37, which corresponds closely to the actual values used, which were 1:0.63: 0.38. The number of different ratios used will depend on the ability of readers to discriminate between closely spaced ratios, and the ability of the printer to apply the requested quantity of each color.

Under control of the printing application 42, the printer 10 can create a batch 50 of security labels 54, each label 54 printed with one of n different composite signatures. In this example, n is ten. The ten different composite signatures have the composite signature codes (first security fluid to second security fluid to third security fluid) shown below in Table 3.

TABLE 3

Ten different code printing parameters

| Number | Code Printing Parameters |
|---|---|
| 1 | 100,0,100 |
| 2 | 0,100,0 |
| 3 | 100,0,0 |
| 4 | 100,100,0 |
| 5 | 100,50,0 |
| 6 | 100,50,100 |
| 7 | 30,50,80 |
| 8 | 30,80,50 |
| 9 | 50,50,30 |
| 10 | 50,30,80 |

The printing application 42 randomly assigns one of these ten different code printing parameters to each label 54 on a sheet 52, and then prints the labels, so that each label has one of ten different printed composite security features 64.

Tagging/Authentication System

Figure 8:
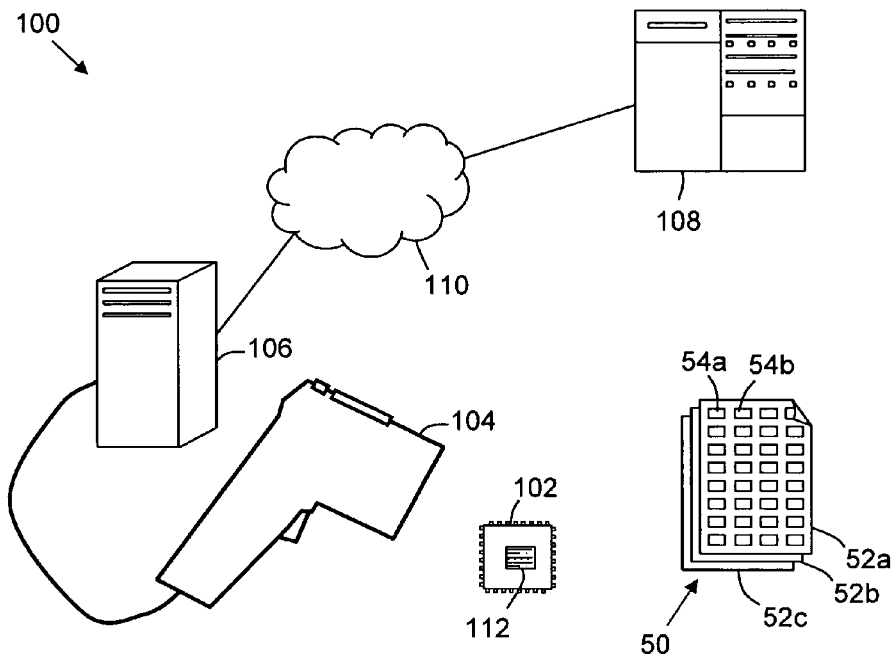
FIG. 8 is a schematic diagram of a tagging system using the batch of labels of FIG. 2.

To explain how the printed composite security features 64 are used to authenticate an item, reference will now also be made to FIG. 8, which is a schematic diagram of a tagging system 100 (also referred to as an authentication system or a data management system) that uses labels 54 having different printed composite security features 64.

The tagging system 100 is used for tagging items 102 (in this embodiment, a microprocessor) with a printed composite security feature 64 so that the authenticity of those items 102 can be verified at some later time.

The tagging system 100 comprises: a secure reader 104, a computer 106 coupled to the secure reader 104, and a remote database 108 coupled to the computer 106 by a network 110.

The microprocessor 102 includes a 2D (two dimensional) barcode 112 laser etched onto its upper surface. The 2D barcode 112 stores a large amount of information, which allows the microprocessor manufacturer to provide serialized parts, that is, each microprocessor 102 has its own unique serial number contained in the 2D barcode 112. Thus, each microprocessor manufactured can be uniquely identified by its 2D barcode 112.

Figure 9:
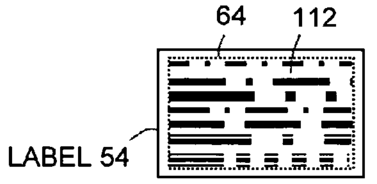
FIG. 9 is a schematic diagram illustrating a label of FIG. 3 applied over a two-dimensional barcode on an item tagged by the system of FIG. 8.

The 2D barcode 112 can be read by conventional 2D barcode readers. The 2D barcode 112 provides a registration area over which a label 54 can be mounted, as will be described in more detail below. The security feature label 54 is dimensioned to be approximately the same size as the 2D barcode 112, as illustrated in FIG. 9.

Figure 10:
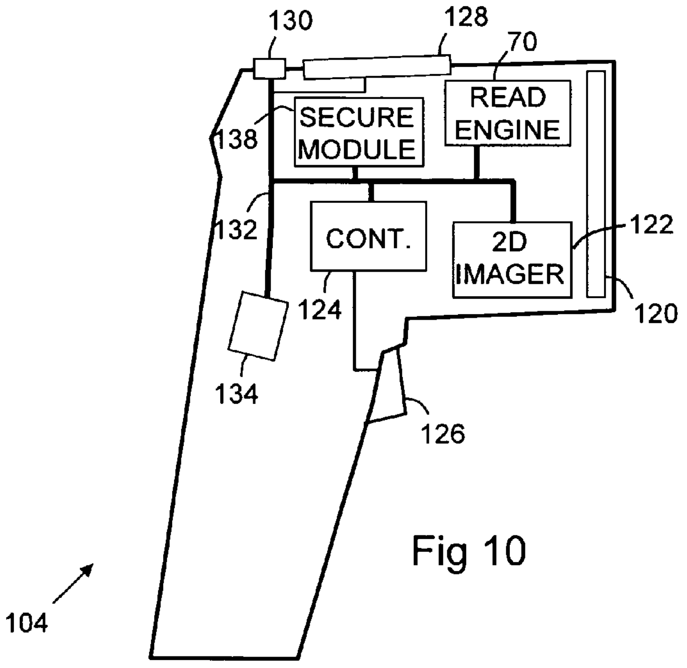
FIG. 10 is a schematic diagram illustrating a part (a secure reader) of the tagging system of FIG. 8 in more detail.
Figure 11:
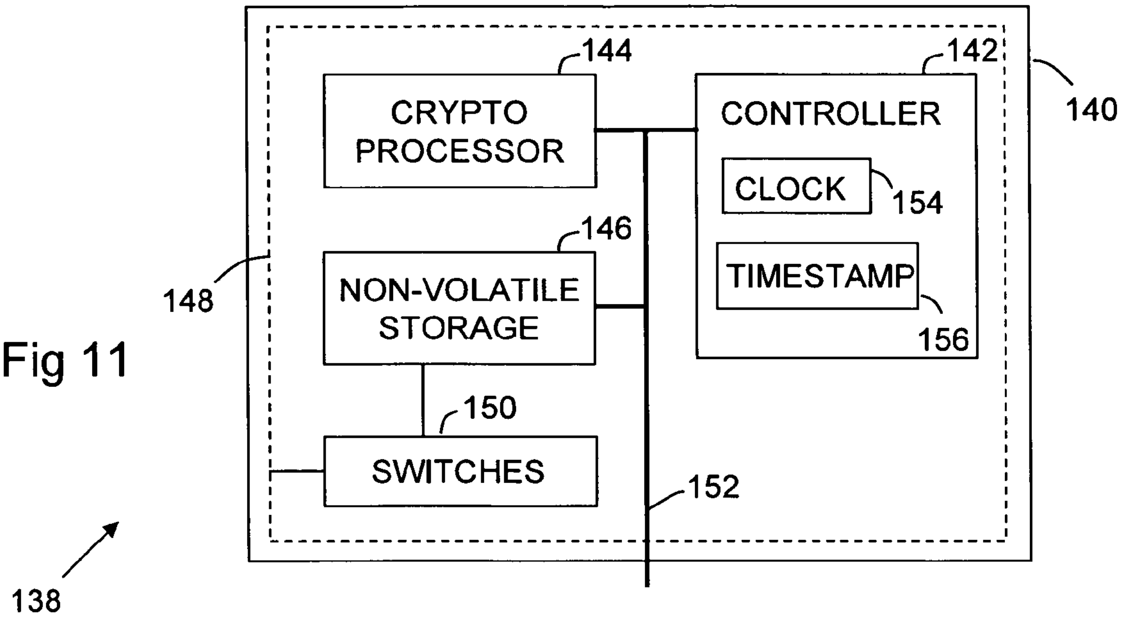
FIG. 11 is a block diagram illustrating a part (a security module) of the secure reader of FIG. 10 in more detail.

Reference will also now be made to FIGS. 10 and 11, which are diagrams showing the secure reader 104, and parts thereof, in more detail.

The secure reader 104 is a combined barcode reader and security feature reader. The secure reader 104 is a modified conventional 2D barcode scanner, such as a barcode reader available from Symbol Technologies, Inc. (trademark) or Metrologic Instruments, Inc. (trademark).

The secure reader 104 comprises: a scanning window 120; a conventional 2D barcode imager 122 aligned with the scanning window 120; associated control electronics 124 for activating the 2D barcode imager 122 (in response to a user depressing a trigger 126) and processing data received from the 2D barcode imager 122; an LCD panel 128 for outputting information to the user (such as information from the 2D barcode 112, the status of the secure reader 104, and such like); a function button 130 for controlling the function of the secure reader 104; internal connections 132 for interconnecting the various components within the secure reader 104; a communications module 134 (including a unique hardware identification in the form of a MAC address) implementing communications with the computer 106; a security feature reader 70 (previously illustrated in FIG. 5); and a security module 138.

The security module 138 (best seen in FIG. 11) comprises a sealed housing 140 in which the following components are mounted: control electronics 142 for driving the security feature reader 70 and for processing data received therefrom; a conventional cryptographic processor 144 to support encrypted communication with the computer 106; non-volatile storage 146 for storing encryption keys and/or encryption algorithms; a security membrane 148 (illustrated by a broken line in FIG. 11) disposed around an inside surface of the housing 140 and coupled to tamper switches 150 that activate an erase line of the non-volatile storage 146 when the membrane 150 is penetrated or disturbed, thereby destroying any stored encryption data (such as keys, algorithms, or such like) in the event that the security module 138 is tampered with. An internal bus arrangement 152 is also provided to facilitate communications within the housing 140.

The control electronics 142 includes a clock 154, and a timestamp generator 156 that maintains a timer using an offset from a known base, incremented by ticks based on the clock 154.

Figure 12:
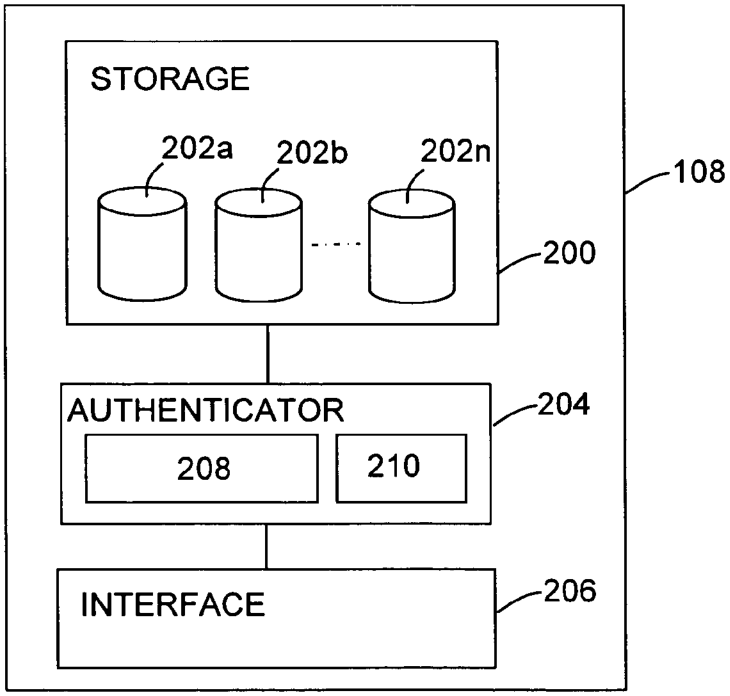
FIG. 12 is a block diagram illustrating a part (a remote database) of the tagging system of FIG. 8 in more detail.

Reference will now also be made to FIG. 12, which is a block diagram illustrating the remote database 108 in more detail, and to FIG. 13A, which is a bock diagram illustrating a data structure of a typical entry in the remote database 108. The remote database 108 comprises: a data store 200 including a plurality of storage areas 202*a, b*, . . . each storage area 202 having the capacity to store a large number of data entries; an authenticator 204 for accessing the data store 200 to authenticate requests received from the secure reader 104; and a secure reader interface 206 for receiving authentication requests from, and transmitting responses to, the secure reader 104.

The authenticator 204 also includes: a security component 208 and a log file 210 for storing details of failed authentications. The security component 208 includes a timestamp generator, a transaction identifier counter, and a unique system identification.

A typical data entry (an item record) stored in storage area 202 has the format shown in FIG. 13A. The item record 220 comprises four main categories of information: customer identification information 222, item information 224, security feature information 226, and secure reader information 228.

The customer identification information 222 includes fields for a global customer identification and for a UCC Company Prefix from a 2D barcode. The global customer identification is assigned by the issuer of the security features (who may be the owner of the data management system 100). The global customer identification is unique for each customer. The security feature issuer issues the security feature batch 50 to the customer. The customer identification information may include additional fields not listed herein.

The item information 224 includes fields for a description of the item, a serial number and/or part number of the item, a location where the item is manufactured and/or distributed, and information from a barcode on the item. The description of the item may include the item name (for example, a brand name), the item type (a microprocessor), item specifications (processing speed), and such like. Additional or different fields may be provided depending on the particular item, the application and/or industry in which that item will be used, and the value of that item.

The security feature information 226 includes fields indicating the type of security feature (optical, magnetic, radio-frequency, or such like) if more than one type of security feature is in use, and data representing the security feature. The data representing the security feature may be raw data, or some transformation of the raw data. In this embodiment, the security features used are optical (luminophores having unique luminescence signatures), and the data representing the security feature is data relating to the ratio of the first (toner cartridge 20*a*), second (toner cartridge 20*b*), and third (toner cartridge 20*c*) security fluids. The data representing the security feature may also include a tolerance, indicating a range of acceptable ratio values.

The secure reader information 228 includes fields indicating the identity and/or location of those readers 104 that are permitted to request authentication of the item listed in the item information 224.

Initial Customer Registration

Prior to using the system, a customer is registered and customer entries are created. This involves the security feature issuer (i) assigning a global customer identification to the customer, (ii) creating entries in the database 108 for the customer (new customer entries), and (iii) providing the customer with a security feature batch 50 printed by the printer 10.

The security feature batch 50 has n different printed composite security features 64, where n is a relatively low number (between five and fifteen) if medium level security is required, and n is a relatively high number (over fifteen) if high level security is required. Typically, the higher the value of n the more the customer has to pay for the batch 50. In this example, n is ten. The batch 50 contains tens of thousands of security feature labels 54, but each of these security feature labels 54 has one of ten (the value of n in this example) different composite luminescence signatures.

When the issuer creates new entries in the database 108 for the customer, the issuer creates a master entry 220*a* (illustrated in FIG. 13B), and populates the master entry 220*a* with appropriate information. The master entry 220*a* includes information that is common to all of the items (microprocessors) 102 to be tagged and has the same format as the item record 220. Any information specific to one item (for example, a serial number) will be added to specific entries under the master entry 220*a*.

In this example, the issuer populates the customer identification information 222*a* with the global customer identification assigned to the manufacturer of that microprocessor 102.

The issuer may populate the item information 224*a* with details provided by the customer, or this may be populated automatically.

The issuer populates the security feature information 226*a* with the peak locations and peak intensity ratios for each of the printed composite security features 64 provided in the batch 50; that is, the ten (n) different printed composite security features 64 provided to the customer by the issuer. Any ratio received from a reader 104 should correspond to one of these ten different printed composite security features 64.

The issuer populates the secure reader information 228*a* with the MAC address of the secure reader 104 (from the communications module 134 in the secure reader 104), and of any other secure readers that will be used to authenticate the item 102. When this has been completed, the master entry 220*a* is complete.

Operation of Tagging/Authentication System

There are two main modes of operation of the tagging system 100. The first mode is to create individual item records (the new customer entries) under the master entry 220*a*; the second mode is to authenticate an item (such as microprocessor 102) referenced by an individual item record. These operations will be described in turn.

Creating Individual Item Records

Once the master entry 220*a* has been created by the issuer, the customer then creates individual item records 220*b* (illustrated in FIG. 13C) under the master record for that item. This will now be described with reference to FIG. 14, which is a flowchart illustrating the steps involved in creating individual item records under the master record for microprocessors 102.

There will be an individual item record 220*b* for each microprocessor 102 because each microprocessor 102 that is manufactured will be associated with one of ten different composite luminescence signatures. This means that the database 108 will store hundreds of thousands or millions of entries for that type of microprocessor 102.

The first step is to change the mode of the secure reader 104 to entry creation mode (step 320). This is performed by a user pressing the function button 130 repeatedly (thereby toggling through different modes) until the LCD panel 128 displays "New Entry".

The user then peels off a label 54 from a sheet 52 in the batch 50, and adheres the peeled label 54 to the microprocessor 102 on top of the 2D barcode 112 (step 322), as illustrated in FIG. 9.

Once in entry creation mode, the user scans the 2D barcode 112 on the microprocessor 102 by aligning the scanning window 120 with the barcode 112 and depressing the trigger 126 (step 324). This causes the 2D barcode imager 122 and associated control electronics 124 to scan and decode the barcode 112, and the read engine 70 and security module 138 to read and decode the printed composite security feature 64 on the newly-applied label 54.

Once the barcode 112 and security feature 64 have been read, the security module 138 then creates a new entry request (step 326). A new entry request informs the database 108 about data from a security feature 64 and data from the 2D barcode 112 on an item 102 tagged by that security feature 64. This will provide the database 108 with the unique serial number of a particular microprocessor 102 and the ratio of peaks from the composite luminescence signature of the security feature 64. The ratio of peaks identifies the proportions of the three security fluids that have been applied to that microprocessor 102, which identifies which of the ten different printed composite security features 64 is being used.

To create the new entry request, the security module 138 constructs a new entry request packet having the format shown in FIG. 15. The new entry request 400 comprises: customer identification information 402 (in FIG. 15 this is provided by a global customer identification field 404 and a UCC Company Prefix field 406), reader identification information 408 (in the form of a MAC address), function request information 410 (in the form of a code indicating that the request is a new entry request to associate a barcode with a printed composite security feature), timestamp information 412 (generated by the timestamp generator 156 in the control electronics 124), barcode data size information 414 indicating the number of bytes of 2D barcode data that will be included in the new entry request 400, barcode data 416 (obtained during the scanning step 324), and spectral peak data 418. The spectral peak data 418 is the ratio of peak intensity of selected peaks and the wavelengths of the selected peaks.

Once the security module 138 has populated the new entry request 400 with the relevant data, the next step is for the security module 138 to encrypt and transmit the new entry request 400 to the secure reader interface 206 in the remote database 108 (step 328) via the computer 106 and network 110. The security module 138 includes an extra layer of encryption for the spectral peak data 418 using a specific key and algorithm stored in non-volatile storage 146 and only used for peak ratio information transmitted during the individual item record creation stage.

Multiple secure readers 104 may be coupled to the computer 106, which can act as a concentrator that connects individual readers 104 to the remote database 108.

On receipt of this encrypted entry request 400, the secure reader interface 206 attempts to decrypt the request 400 (step 330). If the new entry request 400 cannot be decrypted then the secure reader interface 206 responds to the secure reader 104 with a failure message (step 336), and updates the log file 210 with details of the failed request. If the new entry request 400 is correctly decrypted, then the secure reader interface 206 conveys the decrypted new entry request 400 to the authenticator 204 (step 332).

The authenticator 204 parses the new entry request 400 to authenticate the reader 104 that sent the message (step 334). This involves extracting the MAC address of the secure reader 104 from the reader identification information 408 and comparing it with the MAC addresses stored in the secure reader information 228*a* of the master record 220*a* in the database 108. If there is a match then the MAC address corresponds to that of a permitted secure reader 104, indicating that the secure reader 104 is owned or operated by (or under the authority of) the customer.

If the reader authentication step (step 334) is not successful, then the authenticator 204 conveys a failure message to the security module 138 via the secure reader interface 206 and the computer 106 (step 336). The authenticator 204 also updates the log file 210 with details of the failed request.

The authenticator 204 also compares the timestamp information 412 with previous timestamps to ensure that it is subsequent to a timestamp previously received from that secure reader 104.

If the reader authentication step (step 334) is successful, then the authenticator 204 creates a new entry 220*b* in the database 108 under the master entry 220*a* for that customer (step 338).

The new entry 220*b* includes the UCC Company Prefix in the customer identification information 222*b*, which is obtained from the barcode data 416 in the new entry request 400. The new entry 220*b* also includes all or some of the barcode data 416. If only some of the barcode data 416 is stored, then the serial number of the microprocessor 102 will typically be stored, and optionally a hash of the entire 2D barcode data 416.

The authenticator 204 analyzes the spectral peak data 418 to ascertain which of the ten (n) different luminescence signatures has been conveyed. This is achieved by the authenticator 204 comparing the peak locations and ratios with those of the ten (n) different printed composite security features 64. When a match is found, the authenticator 204 calculates a tolerance value (typically a percentage) to indicate how closely the spectral peak data 418 corresponds to the matched printed composite security feature 64. This compensates for variations in print quality. The authenticator 204 stores this tolerance in the security feature information 226*b* of the new entry 220*b*.

The authenticator 204 then creates a link in the security feature information 226*b* of the new entry 220*b* to the appropriate luminescence signature in the security feature information 226*a* of the master entry 220*a*. Thus, the security feature information 226*b* in the new entry 220*b* comprises a link field 226*b* having a link and a tolerance value.

When the new entry 220*b* has been created under the master entry 220*a*, the authenticator 204 conveys a message to the secure reader 104 (via the secure reader interface 206, the network 110, and the computer 106) indicating that the new item record 220*b* has been created successfully. The secure reader 104 informs the user of successful record creation via the LCD panel 128.

The user can then repeat the process for the next microprocessor 102.

Authenticating an Item

When a microprocessor 102 has been tagged with a label 54 and a new entry 220*b* for the tagged microprocessor has been created in the database 108, the microprocessor 102 can then be shipped to a distributor, an intermediary, or an end user (referred to herein as the "purchaser" even though that party may not actually purchase the microprocessors 102).

When the purchaser receives the tagged microprocessor 102, the purchaser can then authenticate the tagged microprocessor 102 using an authentication system, as shown in FIG. 16. This authentication system 500 is very similar to tagging system 100 shown in FIG. 8. The tagging system 100 can also be used as an authentication system.

The authentication system 500 comprises: a secure reader 504, a computer 506 coupled to the secure reader 504, and the remote database 108 coupled to the computer 506 by the network 110. The secure reader 504 is very similar to the secure reader 104, the primary difference being that the secure reader 504 is only operable in one mode (authentication) and does not have a function button 130. Secure reader 104 operates in either entry creation mode or authentication mode. In almost every other respect, the secure reader 104 is identical to the secure reader 504.

Figure 17:
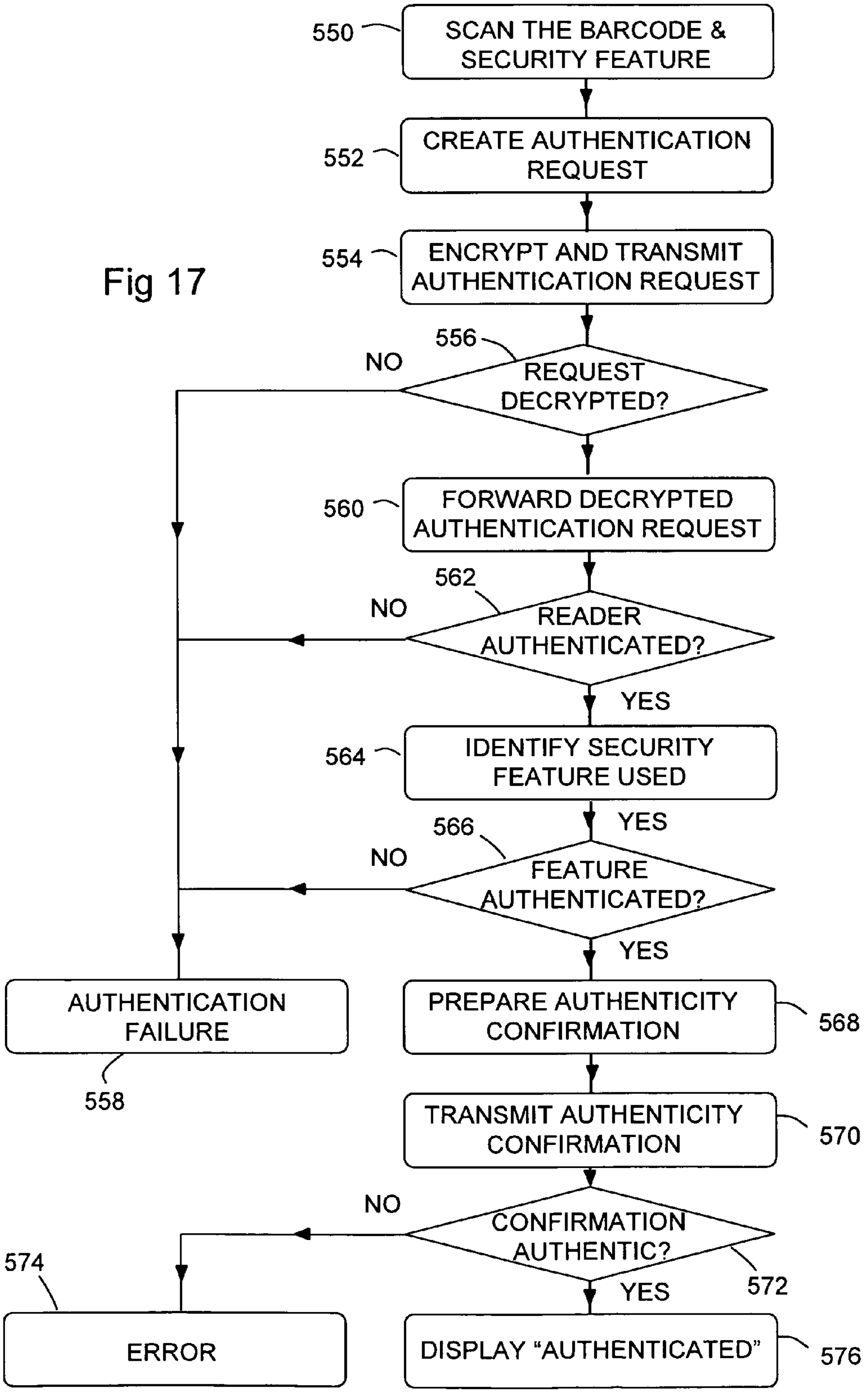
FIG. 17 is a flowchart illustrating the steps involved in authenticating an item (a microprocessor) using the authentication system of FIG. 16.

When the purchaser receives a consignment of microprocessors 102, the purchaser can authenticate a tagged microprocessor 102 using the process illustrated in FIG. 17, which is a flowchart illustrating the steps involved in authenticating a tagged microprocessor 102.

Figure 14:
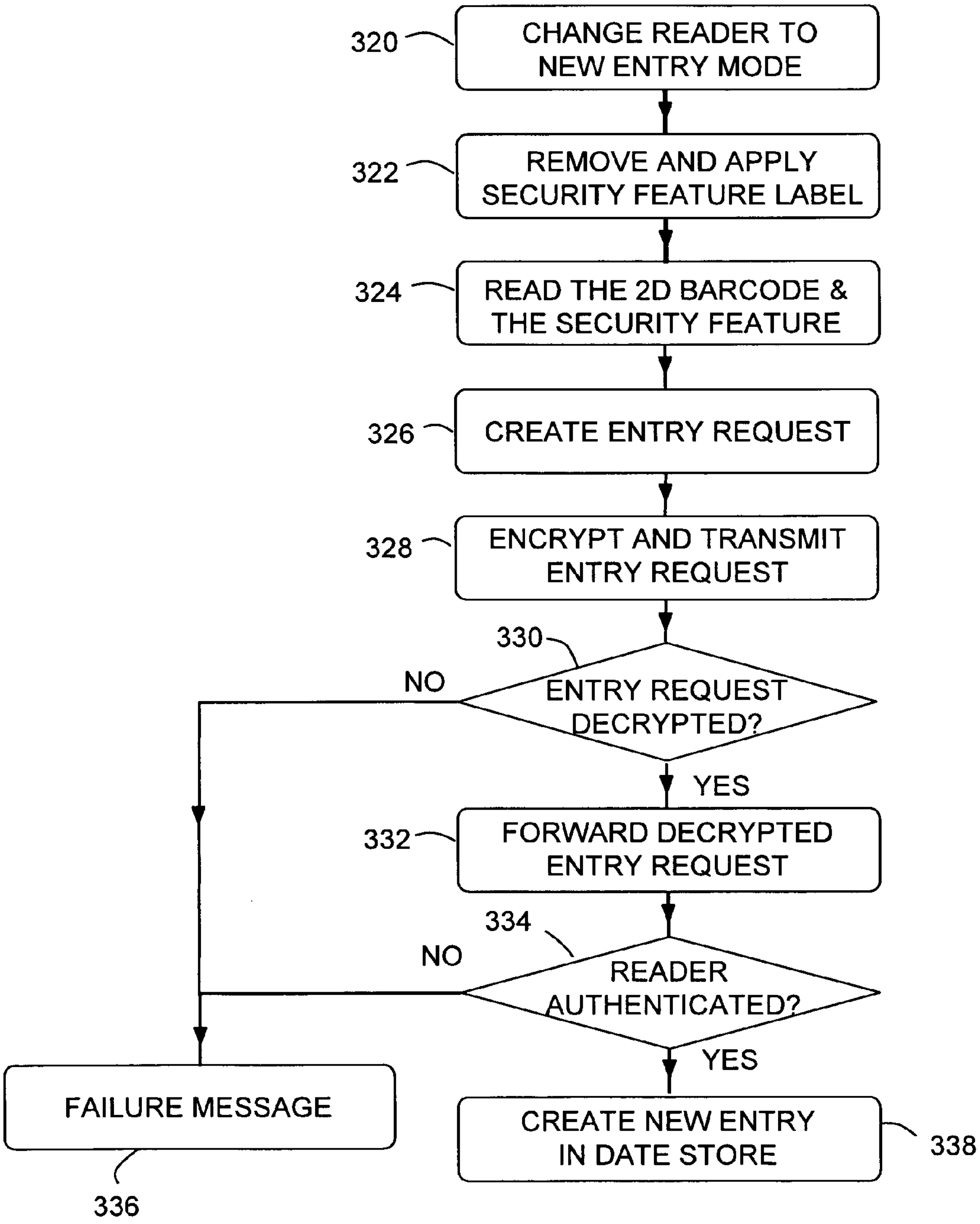
FIG. 14 is a flowchart illustrating the steps involved in creating individual entries in the remote database of FIG. 12.

The purchaser aligns the secure reader 504 with the tagged microprocessor 102 and scans the 2D barcode 112 on the microprocessor 102 (step 550) in a similar way to that described with reference to step 324 of FIG. 14. This causes the secure reader 504 to scan and decode the barcode 112 and to read and decode the printed composite security feature 64.

Once the barcode 112 and the printed composite security feature 64 have been read, the secure reader 504 then creates an authentication request (step 552) using the data read from the barcode 112 (the UCC Company Prefix, and the complete barcode data) and the data read from the printed composite security feature 64 (wavelength and intensity information). The authentication request conveys data about the printed composite security feature 64 to the database 108.

Figure 18:
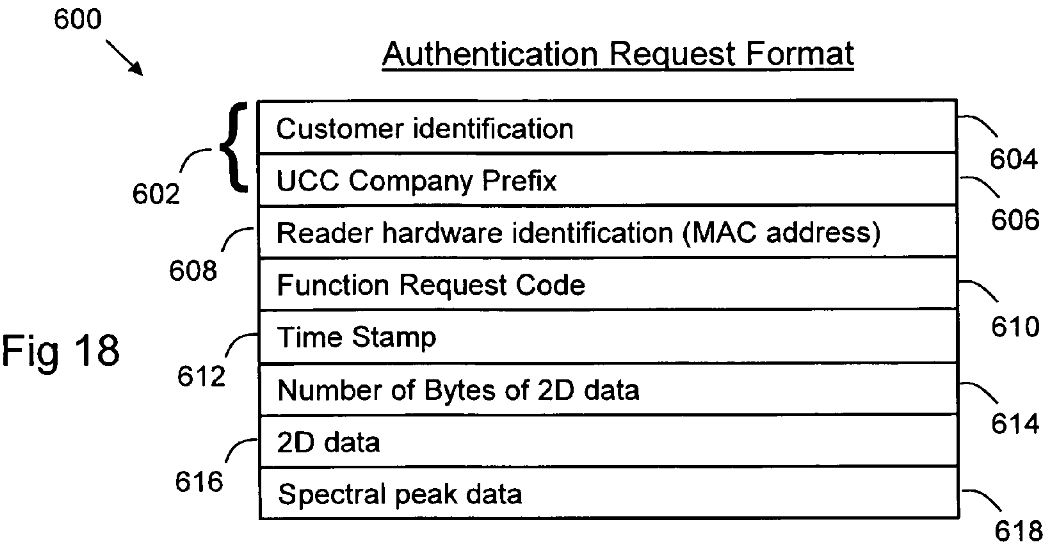
FIG. 18 is a diagram illustrating the format of an authentication request transmitted within the authentication system of FIG. 16.

To create the authentication request, the security module 138 constructs a request packet having the format shown in FIG. 18.

The authentication request 600 comprises: customer identification information 602 (provided by a global customer identification field 604 and a UCC Company Prefix field 606), reader identification information 608 (in the form of a MAC address), function request information 610 (in the form of a code indicating that the request is an authentication request 600), timestamp information 612, barcode data size information 614 indicating the number of bytes of 2D barcode data that will be included in the authentication request 600, barcode data 616 (obtained during the scanning step 550), and spectral peak data 618. The spectral peak data 618 contains the wavelength and intensity of all of the peaks measured during the scanning step 550.

Once the security reader 504 has populated the authentication request 600 with the relevant data, the next step is for the security reader 504 to encrypt and transmit the authentication request 600 to the secure reader interface 206 in the database 108 (step 554).

On receipt of this encrypted authentication request, the secure reader interface 206 decrypts the request 600 (step 556). If the authentication request 600 cannot be decrypted then the secure reader interface 206 responds to the secure reader 504 with a failure message (step 558), and updates the log file 210 with details of the failed request. If the authentication request 600 is correctly decrypted, then the secure reader interface 206 conveys the decrypted authentication request 600 to the authenticator 204 (step 560).

The authenticator 204 then attempts to authenticate the secure reader 504 (step 562) by parsing the authentication request 600 in a similar way to that described with reference to step 334 of FIG. 14; namely, the authenticator 204 ascertains if the MAC address of the secure reader 504 corresponds to that of a permitted reader, and if so, if the permitted reader is owned or operated by (or under the authority of) the customer.

If the reader authentication step (step 562) is not successful (for example, because the MAC is not present, or present but not correct, or because the global identification in the request is not a recognized global identification, or because it is a recognized global identification but does not correspond to the global identification associated with that MAC address), then the authenticator 204 conveys a failure message to the secure reader 504 via the secure reader interface 206, the network 110, and the computer 506 (step 558), and updates the log file 210 with details of the failed request.

If the reader authentication step (step 562) is successful, then the authenticator 204 parses the authentication request 600 to ascertain which of the ten printed composite security features 64 has been applied to the microprocessor 102 (step 564). The authenticator 204 does this by reading the link field 226*b*, which identifies the particular security feature used.

The authenticator 204 then authenticates the security feature (step 566). This is performed by the authenticator 204 analyzing the spectral peak data 618 containing the wavelength and intensity of all of the peaks measured, and calculating a ratio of a peak from the first security fluid (if present) to a peak from the second security fluid (if present) to a peak from a third security fluid (if present). The authenticator 204 then compares this calculated ratio with a ratio of luminescence peaks referenced by link field 226*b*. If the difference between the calculated ratio and the stored ratio is minimal (that is, within the range of the tolerance value stored in link field 226*b*) then there is a match (that is, the authentication is successful).

If the security feature authentication step (step 566) is not successful, then the authenticator 204 conveys a failure message to the secure reader 504 via the secure reader interface 206, the network 110, and the computer 506 (step 558), and updates the log file 210 with details of the failed request.

If the security feature authentication step (step 566) is successful, then the authenticator 204 prepares an authenticity confirmation for sending to the secure reader 504 that sent the authentication request 600 (step 568).

Figure 19:
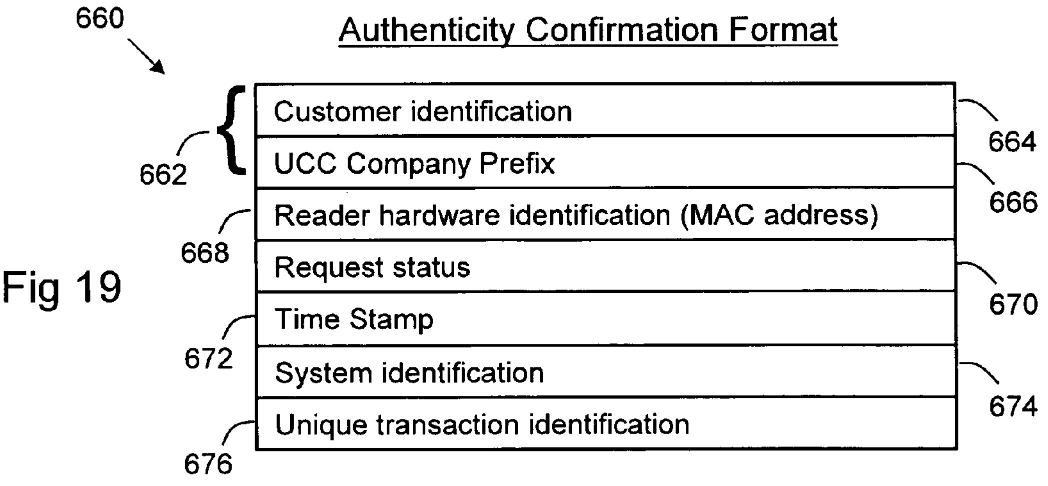
FIG. 19 is a diagram illustrating the format of an authenticity confirmation sent in response to the authentication request of FIG. 18.

The authenticity confirmation has the format shown in FIG. 19. The authenticity confirmation 660 comprises: customer identification information 662 (provided by a global customer identification field 664 and a UCC Company Prefix field 666), reader identification information 668 (in the form of a MAC address), request status information 670 (which is set to indicate that the authentication request was successful), timestamp information 672 (generated by the timestamp generator in the security component 208), a system identification field 674 populated by the unique system identification from the security component 208, and a unique transaction identifier field 676 populated by the current value of the transaction identifier counter in the security component 208.

The authenticator 204 then sends the authenticity confirmation 660 to the secure reader 504 via the secure reader interface 206, the network 110, and the computer 506 (step 570).

On receipt of the authenticity confirmation 660, the secure reader 504 authenticates the authenticity confirmation 660 (step 572). It does this by decrypting then parsing the authenticity confirmation 660 to validate that the system identification is correct and that the value of the timestamp is subsequent to the value of the last timestamp received by the secure reader 504.

If the authenticity confirmation 660 cannot be decrypted, or the system identification is not correct, or the timestamp is not subsequent to the last timestamp received, then the secure reader 504 displays an error message (step 574).

If the authenticity confirmation 660 is authenticated by the secure reader 504, then the secure reader 504 displays the text "Authenticated" (step 576) to the purchaser.

The purchaser can then use the system 500 to authenticate the next tagged microprocessor 102.

A purchaser may only authenticate one in every m microprocessors received, for example, one in every hundred or one in every thousand microprocessors received, as a spot check or as part of a quality assurance program.

The authenticator 204 may record the identity and/or location of the secure reader that issues an authentication request to ascertain if multiple authentication requests are received for the same part from different geographical locations within a short space of time. This may indicate that the part has been compromised by a counterfeiter.

It will now be appreciated that the above embodiment has the advantage that a number of different codes from a small number of different security features can be used with an item (for example, a type of microprocessor) so that a counterfeiter must know which code is associated with each instance of that item. This greatly increases the security of the system.

In addition to being used with a batch 50 of labels, the printer 10 can be used to print a label on demand. This involves a user operating the printing application 42 to select a desired shape and a desired composite signature code. The user can also add text (pure black) that will be visible to a human. This allows a user to scan a barcode and to select a composite signature code that is related to the barcode. For example, the barcode may include composite signature code digits, or digits that are algorithmically or otherwise related to the composite signature code. Once these digits are read (and transformed if required), a label can be printed using the read (or transformed) composite signature code to create a printed composite security feature associated with the read composite signature code. This would allow off-line authentication of the printed composite security feature.

Reference will now be made to FIG. 20, which is a simplified block diagram of a color inkjet printer according to another embodiment of the present invention. In FIG. 20, the printer 800 is based on a conventional inkjet printer and includes a chassis 802 housing four security fluid cartridges 804*a, b, c,* and *d*, a media source 806 (which stores labels in this embodiment), a media feed path 808 (comprising rollers, belts and gears), and a printer controller 810.

The security fluid cartridges may be structurally identical to conventional inkjet cartridges, but are filled with security fluid having a unique luminescence signature rather than colored ink.

The printer controller 810 includes a conventional translation program 812 that translates received printing parameters (for example, in RGB format) into control parameters for controlling the type and amount of ink to be applied. The printer controller 810 also includes a print engine program 814 that uses control parameters output by the translation program 812 to control the components in the printer 800 (such as the inkjet cartridges) so that the desired amounts of each ink are deposited to fulfil a print request received from a computer.

The inkjet printer 800 may be used in a similar way to that described with reference to the printer of FIG. 1. The difference between the embodiments relates to the different printing mechanisms used in the printers.

These embodiments have the advantage that a small number of security fluids (such as inks) can be combined during a printing process to yield a large number of unique spectra.

Various modifications may be made to the above described embodiment within the scope of the present invention. For example, in the above embodiment, four toner cartridges are used. In other embodiments, two, three, five or more cartridges may be used.

In other embodiments, the composite signature code may comprise fewer or greater than three digits. In other embodiments, the composite signature code may have the same number of digits as there are cartridges.

In the above laser printer embodiment, a conventional laser printer is used, with the conventional four CMYK cartridges replaced with four secure ink toner cartridges. A standard software application (for example, Microsoft (trademark) Word (trademark)) may be used to print labels. The selected color will be converted automatically by the laser printer. By comparing the spectrum of a composite signature with the RGB value used to print that composite signature for many different RBG values, it is possible to create a mapping of RGB values to composite signatures. This mapping can then be used to select the RGB value that will produce the desired composite signature. This embodiment is very simple because it allows a convention laser printer controller to be used without any modification. However, in other embodiments the printer controller may be programmed to map a received composite signature code into a defined set of code printing parameters. This has the advantage that the printer is forced into a pre-defined mapping of composite signature codes to code printing parameters.

In one of the above embodiments, when the customer creates individual item records, the reader transmits the ratio of peaks identifying the proportions of the three security fluids that have been applied to that item. In other embodiments, the reader may transmit the entire spectrum, the intensity values for all of the peaks, the intensity values for some of the peaks, or such like. This information may be specially encrypted, for example, using an encryption key and/or an encryption algorithm only used for transmitting the ratio of peaks (or other spectrum information) during the individual item record creation stage.

In FIGS. 4*a* to 4*c*, each security fluid has two peaks. In other embodiments, each security fluid may have a greater or smaller number of peaks than two.

In FIGS. 4*a* to 4*c*, the first peak (lowest wavelength) of each spectrum was used in the ratio of peaks; in other embodiments, the second peak, the last peak, the second last peak, or any other desired peak may be used.

In other embodiments, the database 108 may control the reader 104 by instructing the reader to return peak location and intensity information for only some of the peaks. In other embodiments, the database 108 may be located in the same geographical area as one or more secure readers.

In other embodiments, the batch may be provided as a roll of labels.

In other embodiments, the printer may print visible data on a label. This visible data may relate to the ratio of peaks printed on that label. Alternatively, the visible data may be a verification code that will be returned by the database 108 on successful authentication. This verification code may be displayed by the secure reader 104 on the LCD panel 128 to allow an operator of the secure reader 104 to compare the received verification code with the verification code printed on the label. This provides another safeguard against man-in-the-middle attacks.

Where visible data is printed, the visible data may be an encrypted or plaintext version of the composite signature code or the code printing parameters used for printing that label. The visible data may be algorithmically related to the composite signature code or the code printing parameters used for printing that label.

In other embodiments, different printing mechanisms, for example, thermal transfer printing, dot matrix printing, and such like, may be used.

In some embodiments, each printed composite security feature may be read after printing to ensure that the proportions of security fluid applied are correct. If the proportions are not correct, then the printer may be tested to ascertain if there is a fault. This has the advantage to removing printer variability and early detection of printer malfunction; however, it is also time consuming.

In some embodiments, the security fluids may include quantum dots, dyes, or the like, in addition to, or instead of, silica particles.

What is claimed is:

1. A printer for printing customized security features on a medium, the printer comprising:

a first container storing a first security fluid having a first luminescence signature, a second container storing a second security fluid having a second luminescence signature different to the first luminescence signature, a printer controller for receiving a printing request for a composite luminescence signature and for selectively controlling fluid application from the first and second containers to apply the first and second security fluids to the medium in a proportion required to produce a composite luminescence signature that fulfils the printing request;

wherein the composite luminescence signature comprises a luminescence spectrum composed of the first and second luminescence signatures in a ratio determined by code printing parameters directly related to quantities of each security fluid to be applied, and wherein the printer includes a security module to prevent access to the code printing parameters.

2. A printer according to claim 1, wherein the printer controller includes a communications facility for receiving a composite signature code.

3. A printer according to claim 2, wherein the communications facility relays the composite signature code to a translation facility that converts the composite signature code to code printing parameters.

4. A printer according to claim 1, wherein the first container is selected from the group consisting of a laser printer cartridge, an inkjet printer cartridge, and a thermal transfer ribbon.

5. A method of printing customized security features on a medium, the method comprising:

receiving a printing request for a composite luminescence signature;

ascertaining a proportion of a first security fluid and a proportion of a second security fluid required to produce a composite luminescence signature that fulfils the printing request; and selectively controlling application of the first security fluid and application of the second security fluid in the ascertained proportions to fulfil the printing request, wherein the method includes the further step of printing a reference number indicating the proportions of the first and second security fluids used, respectively.

6. A method of printing customized security features on a medium, the method comprising:

receiving a printing request; and selectively controlling fluid application from (i) a first container storing a first security fluid having a first luminescence signature and (ii) a second container storing a second security fluid having a second luminescence signature different to the first luminescence signature, to apply the first and second security fluids to the medium in a proportion required to produce a composite signature that fulfils the printing request, wherein the composite signature comprises a luminescence spectrum composed of the first and second luminescence signatures in a ratio determined by code printing parameters directly related to quantities of each security fluid to be applied, the method further comprising deleting the code printing parameters if a security module is tampered with.

7. A system for tagging items with a customized security feature, the system comprising:

a reader for reading a unique code carried by an item; and a printer for printing a customized security feature associated with the unique code so that the customized security feature has a composite signature code or code printing parameters derived from the unique code.

8. A system according to claim 7, wherein the system further comprises a database for storing, for each tagged item, details of the unique code and its associated customized security feature.

* * * * *